Figure 1:
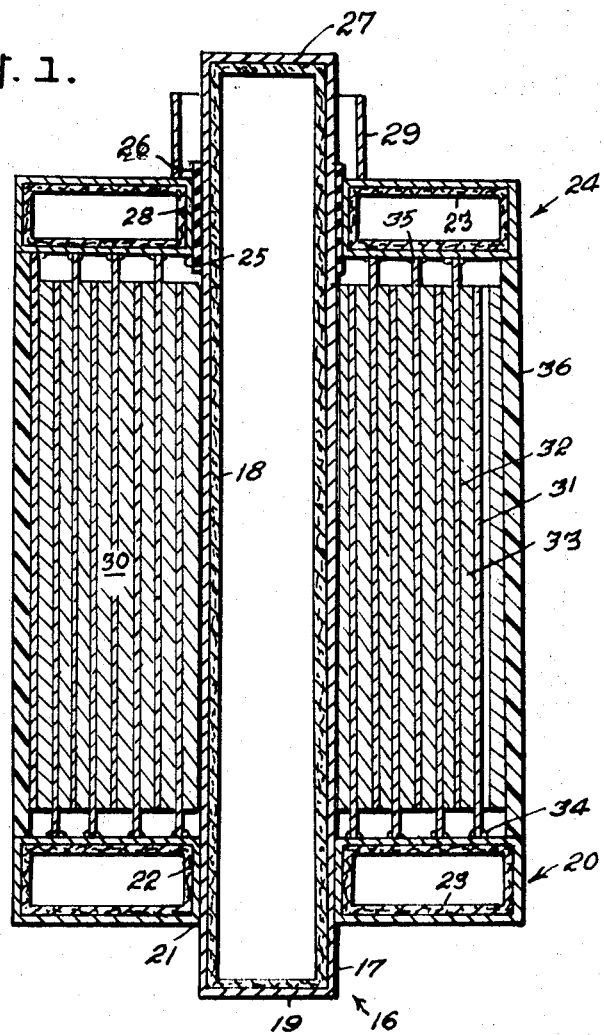

United States Patent

[11] 3,622,846

[72] Inventor Eberhart Reimers
7700 Random Run L. #201, Falls Church, Va. 22042
[21] Appl. No. 85,934
[22] Filed Nov. 2, 1970
[45] Patented Nov. 23, 1971

[54] CAPACITOR ENERGY STORAGE IMPROVEMENT BY MEANS OF HEAT PIPE
8 Claims, 2 Drawing Figs.

[52] U.S. Cl. .................................................. 317/245, 317/260
[51] Int. Cl. .................................................. H01g 1/11
[50] Field of Search .................................................. 317/243; 1/260; 165/105

[56] References Cited
UNITED STATES PATENTS
2,186,842 1/1940 Scoville ....................... 317/243
3,243,672 3/1966 Simonds ....................... 317/243

Primary Examiner—E. A. Goldberg
Attorneys—Harry M. Saragovitz, Edward J. Kelly and Herbert Berl ABSTRACT: The invention is a heat pipe coolable capacitor in which the heat generated therein and manifested in both radial and axial flow is removed by a novel arrangement of heat pipes.

PATENTED NOV 23 1971

3,622,846

INVENTOR,
Eberhart Reimers
BY: Harry M. Saragovitz,
Edward J. Kelly &
Herbert Berl  Attorneys.

CAPACITOR ENERGY STORAGE IMPROVEMENT BY MEANS OF HEAT PIPE

The invention described herein may be manufactured, used, and licensed by or for the Government for governmental purposes without the payment to me of any royalty thereon.

The invention relates to removal of heat from electrical capacitors and more particularly to a capacitor construction including a heat sink arrangement that results in a capacitor with increased watt-second energy storage capacity per unit volume.

Current solid-state power conversion technology requires capacitors to filter ripple voltages in synthesized AC power supplied or to store and deliver large quantities of pulsed energy for equipment commutating purposes. The resultant repetitive charge reversal within the capacitor produces internal dielectric heating and self-heating due to conduction losses in the foil. This heat normally is stored at the center of the capacitor and can be removed only by surface cooling of its enclosure. Large thermal time constants within the wound foil severely limit the reactive power capacity per unit volume.

Thus, the rather poor KVAR utilization per unit volume significantly contributes to the size and weight of complex solid-state power conversion systems.

Prior art capacitors generally utilize a tightly wound foil which is immersed in oil so as to prevent arc-over at the fringes of the foil. Due to dielectric losses and due to foil losses, a repetitive charge reversal within the capacitor causes the foil to warm up. This heat loss is trapped at the center of the capacitor and can be removed, in accordance with conventional practices, by surfaces cooling of its enclosure or by additionally including an internal tube through the center thereof for a cooling fluid circulating therethrough. One example of this is disclosed in U.S. Pat. No. 3,243,672 to D. H. Simonds et al. Such cooling arrangements results in a fairly large thermal time constant which severely limits the watt-second energy storage capacity per unit volume.

A principal object of the invention is a more effective heat removal from a capacitor and the subsequent increase in watt-energy storage capacity thereof per unit volume. In one instant, this can be accomplished by winding the foil tightly around a heat pipe that is heat sunk to the heat radiating metal can enclosure. Such an arrangement eliminates the hot spot within the foil by considerably shortening the thermal time constant of the entire component due the characteristic of the heat pipe to transfer heat to the outside with minimum losses nearly instantaneously. Hence, the watt-energy storage capacity can be significantly increased. Other arrangements are possible, once the principle is understood.

Figure 2:
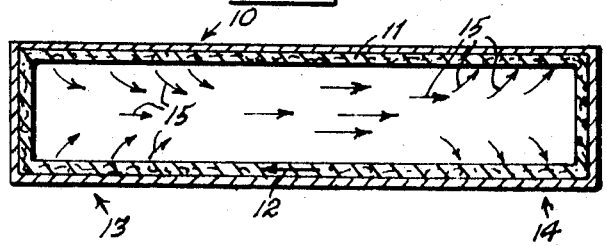

The invention will be more fully apparent from the following detailed description of a preferred embodiment taken in conjunction with the appended drawings in which:

FIG. 1 is a cross-sectional view of a capacitor within the scope of the invention; and FIG. 2 is a cross-sectional view of a heat pipe.

To provide a more complete understanding of the invention, the following brief description of a heat pipe, claimed herein in specific combination with a capacitor, is submitted. Referring now to FIG. 2, the heat pipe may take the form of a closed evacuated hollow metal cylinder 10 having a wick liner 11 partially saturated with a volatile fluid 12 and affixed to the inner surfaces of the cylinder. Reference number 13 indicate the evaporator section and 14 the condenser section. When heat is added to the evaporator section 13, fluid 12 volatizes and goes down the pipe as a vapor 15 to the externally heat sunk condenser section where it encounters a temperature lower than that at the evaporator section whereupon it returns to the wick in form of a liquid vaporization. A detailed explanation of the principle of the heat pipe is disclosed in a an article entitled "The Heat Pipe," authored by K. Thomas Feldman, Jr. and Glen H. Whiting and published in the Feb. 1967 edition of Mechanical Engineering, published by A.S.M.E.

In FIG. 1 there is illustrated a preferred embodiment of the invention involving a capacitor in combination with a new and novel arrangement of the above described heat pipe whereby the watt-energy storage capacity per unit volume is significantly increased. Reference numeral 16 indicates a cylindrical heat pipe which comprises a heat sink for the radial heat flow of the capacitor and which is in the form of a closed evacuated metal tube 17 wherein the inner surfaces thereof has a wick 18 affixed thereto which may be of material, for example, woven cloth or fiberglas saturated with a volatile liquid. A hollow evacuated metal disc 20 comprising a second heat pipe formed with a central aperture 21 dimensioned to neatly fit tube 17 is positioned adjacent the condenser 19 of heat pipe 16 and is retained thereby on by well-known means such as a solder joint between tube 17 and the outside surface of wall 22 of the aperture whereby excellent mechanical, thermal and electrical contact is obtained therebetween. The metal disc 20 also has all of the inner surfaces thereof lined with a wick 23 that is partially saturated with volatile liquid. The wall 22 of hollow metal disc 20 forms a condenser section and the section of tube 17 to which wall 22 is affixed forms an evaporator section. A second hollow evacuated metal disc 24 comprising a third heat pipe, identical to disc heat pipe 20, is formed with a central aperture 25, into which is force fitted a tubular electrical insulator 26. This assembly is then positioned on metal tube 17 adjacent its end 27 with the tubular insulator 26 providing electrical insulation and thermal conductivity between the disc heat pipe 24 and cylindrical heat pipe 16. The wall 28 of aperture 25 forms a condenser surface and the area of heat pipe 17 that is surrounded by wall 28 forms an evaporator section. A collar 29 formed on the top of disc 24 coaxial with that portion of tube 17 extending outwardly of disc 24 forms therewith a coaxial terminal for the capacitor. The volatile liquid with which wicks 18 and 23 are saturated may include water, acetone, glycerine, ammonia, molten salts or a metallic slurry either of cesium, sodium, potassium, lead, indium, lithium, bismuth or silver. The cylindrical heat pipe 16 between disc heat pipes 20 and 24 has a convolutely wound extended foil capacitance section 30 positioned thereabout. The capacitance section which is shown in enlarged cross section in the drawing for the purpose of clarity comprises a outer foil 31 and an inner foil 32 separated by electrical insulation 33 such as impregnated kraft paper, mylar or polycarbonate film. The extended edge of ground foil 31 is soldered to disc 20 as indicated by reference numeral 34 and the extended edge of inner foil 32 is soldered to disc 24 as indicated by reference numeral 35 whereby the heat due to axial flow in the outer and inner foils is coupled to disc heat pipes 20 and 24, respectively, and hence down cylindrical heat pipe 16 to its condenser section or end 19. Surrounding the capacitance section 30 and affixed between discs 20 and 24 is an electrical insulating but thermally conductive shell 36 which is connected to an external hat sink.

I claim:

1. A capacitor comprising in combination:

a first heat pipe consisting of an evacuated metal tube having its inner surfaces provided with a wick partially saturated with a volatile liquid;

a second heat pipe comprising a centrally perforated evacuated hollow metal disc member having the inner surfaces thereof provided with a wick saturated with a volatile liquid and affixed in electrical and thermal conductivity coaxially with said first heat pipe adjacent one end thereof;

a third heat pipe comprising a centrally perforated, evacuated hollow disc member having a tubular electrical insulator affixed in said perforation and having its inner surfaces provided with a wick partially saturated with a volatile liquid, and affixed in electrical insulation and thermal conductivity coaxially with said first heat pipe adjacent the end thereof opposite said one end;

a convolutely wound extended foil capacitance section positioned around said first heat pipe between said second and third heat pipes comprising an outer (first) foil and an inner foil spaced by electrical insulation;

said outer foil having its extended edge soldered to a inwardly directed plane surface of said second heat pipe whereby the section of said first heat pipe extending from said third heat pipe to said end thereof opposite said one end forms one terminal of said capacitor;

said inner (second) foil having its extended edge soldered to a inwardly directed plane surface of said third heat pipe;

a metal collar coaxial with said fist heat pipe affixed to an outwardly directed plane surface of said third heat pipe along the section thereof contiguous with said end opposite said one end and forming another terminal of said capacitor; and an electrical insulating shell extending between said inwardly directed plane surfaces and encompassing said capacitance section.

2. The invention in accordance with claim 1 wherein said volatile liquid is water.

3. The invention in accordance with claim 1 wherein said volatile liquid is acetone.

4. The invention in accordance with claim 1 wherein said volatile liquid is glycerine.

5. The invention in accordance with claim 1 wherein said volatile liquid is ammonia.

6. The invention in accordance with claim 1 wherein said volatile liquid is a molten salt.

7. The invention in accordance with claim 1 wherein said volatile liquid is a metallic slurry.

8. A capacitor comprising in combination:

a heat pipe consisting of an evacuated metal tube having its inner surfaces provided with a wick saturated with a volatile liquid;

first thermal conductive means affixed in electrical and thermal conductivity coaxially with said heat pipe adjacent one end thereof;

second thermal conductive means affixed in electrical insulation and thermal conductivity coaxially with said first heat pipe adjacent the end thereof opposite said one end;

a convolutely wound extended foil capacitance section positioned around said heat pipe between said first and second thermal conductive means comprising an outer foil and an inner foil spaced by electrical insulation;

said outer foil having its extended edge soldered to a inwardly directed plane surface of said first thermal conductive means whereby the section of said heat pipe extending from said second thermal conductive means to said end thereof opposite said one end forms one terminal of said capacitor;

said inner foil having its extended edge soldered to a inwardly directed plane surface of said second thermal conductive means;

said second thermal conductive means including a metal collar coaxial with said first heat pipe and forming another terminal of said capacitor; and an electrically insulating shell encompassing said capacitance section.

* * * * *